Jan. 15, 1963 L. A. DE KLOTZ 3,073,558
CHRISTMAS TREE STAND
Filed April 5, 1960
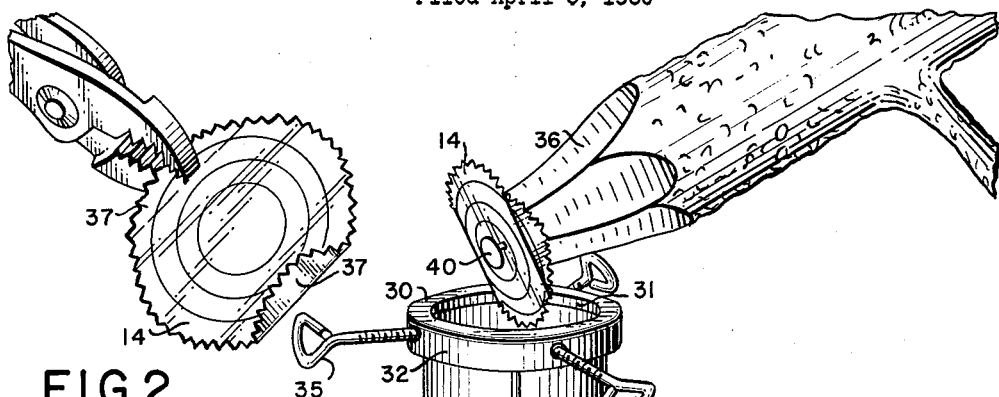
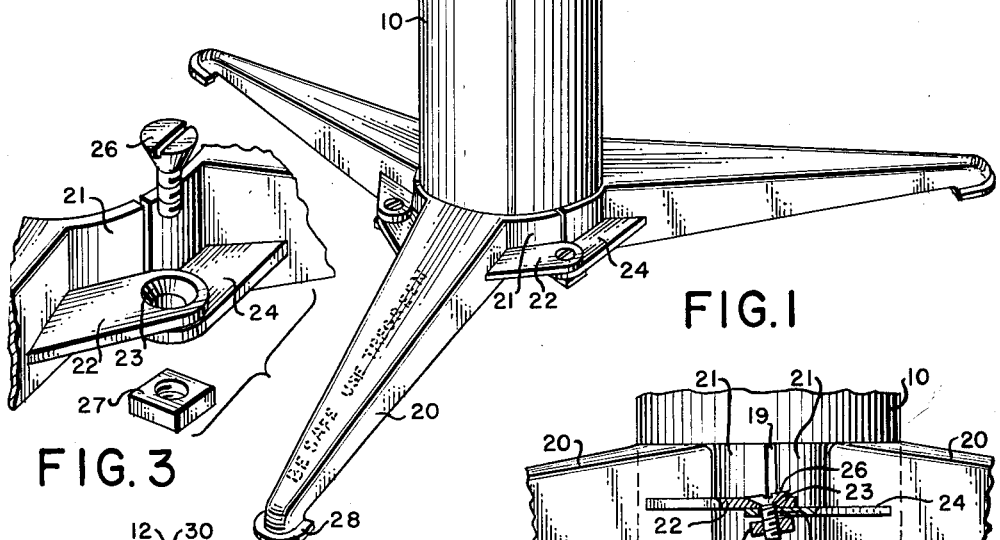
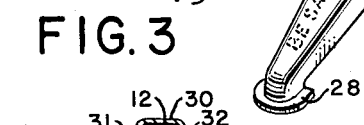
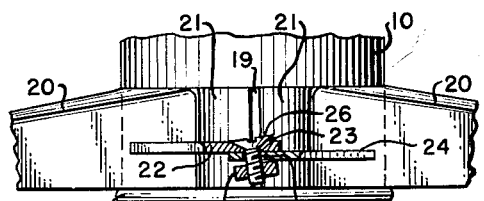
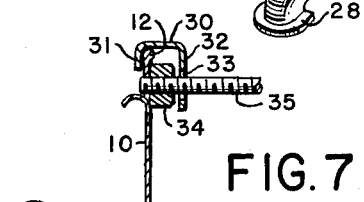
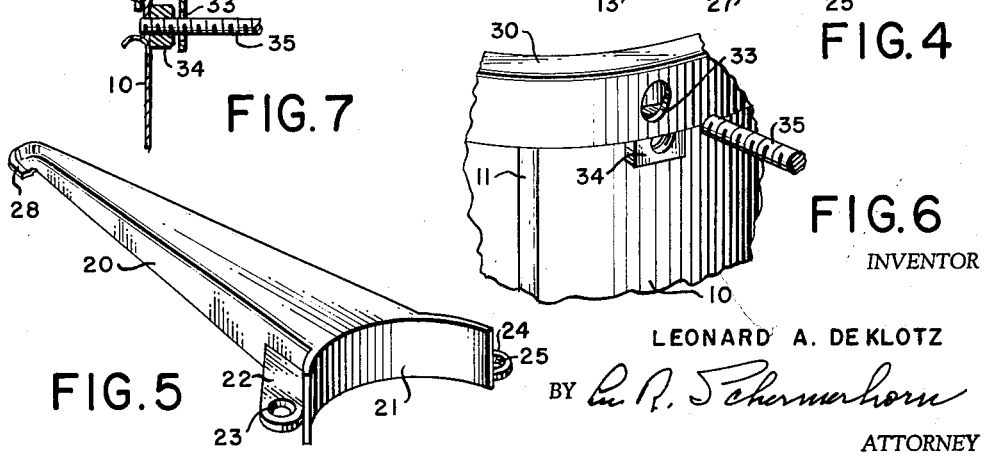
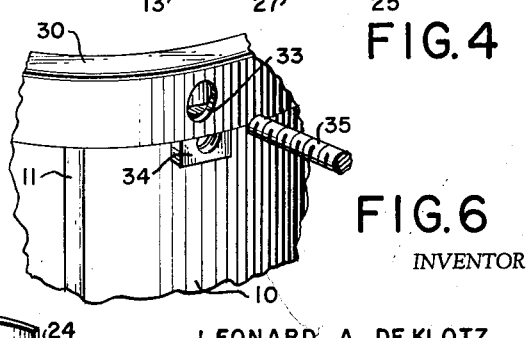
INVENTOR
LEONARD A. DE KLOTZ
BY
ATTORNEY United States Patent Office 3,073,558
Patented Jan. 15, 1963

3,073,558
CHRISTMAS TREE STAND
Leonard A. De Klotz, Portland, Oreg., assignor to
Tregreen Co., Portland, Oreg., a partnership
Filed Apr. 5, 1960, Ser. No. 20,177
5 Claims. (Cl. 248—48)

This invention relates to tree stands and has particular reference to a stand for home use utilizing a container for a liquid preservative as a support for the tree.

Conventional tree holders usually lack adequate means to grip and support the tree firmly and they usually hold only a small quantity of liquid in a small cup or shallow pan. When the liquid container is designed to hold an adequate quantity of liquid, the stand is heavy and cumbersome. Another shortcoming of conventional stands of this type is that they tend to come apart or fall off the trunk when the tree is lifted to move it.

It is, accordingly, an object of the present invention to provide an improved tree stand which firmly grips the trunk and which has adequate stability to prevent overturning.

Another object is to provide a tree stand which will not fall apart or drop off the trunk when the tree is lifted in moving the tree and stand from one place to another.

Another object is to provide a tree stand which has adequate liquid capacity and provides for deep immersion of the trunk in liquid.

Another object is to provide a tree stand composed of separable parts requiring a minimum of space for shipment and season to season storage in the home.

Another object is to provide a tree stand having a low shipping weight.

Another object is to provide a tree stand of simple construction requiring a minimum number of different parts which must be specially fabricated.

Another object is to provide a tree stand having a plurality of identical parts which may be economically molded, stamped or die cast.

Another object is to provide a tree stand in which an hermetically sealed metal can containing a tree preservative becomes the liquid container for the stand when the top is cut out of the can.

Another object is to provide a tree stand of the type described which is inexpensive to manufacture, simple and easy to assemble, disassemble and store and which is adequately rugged and reliable in use.

The present stand requires only two dies to make its specially formed parts, plus a number of standard parts which are readily available at low cost. One die forms the legs which are identical and may be bolted together to grip a liquid container firmly, the liquid container being a conventional form of can without any modification. The other die forms a ring for the top of the can which carries screws for clamping the tree trunk. The disc which is cut out of the top of the can when the can is opened is utilized as a centering device to hold the lower end of the trunk centered in the bottom of the can. The various parts are detachably connected for compact shipment or storage in a small package.

The invention will be better understood and additional objects and advantages will become apparent as the description proceeds in connection with a preferred embodiment of the invention illustrated on the accompanying drawing. Various changes may be made, however, in the construction and arrangement of parts and all such modifications within the scope of the appended claims are included in the invention.

In the drawing:
FIGURE 1 is a perspective view of the present tree stand showing the manner in which a tree is inserted therein;

FIGURE 2 is a perspective view showing how the can top is prepared for attachment to the end of the tree trunk;

FIGURE 3 is a fragmentary perspective view showing how the legs are connected together;

FIGURE 4 is a fragmentary side elevation view with parts in section illustrating how the fastening together of the leg clamps the legs to the bottom of a can which forms a support for the tree;

FIGURE 5 is a perspective view of a leg;

FIGURE 6 is a fragmentary perspective view showing the manner in which the cup ring is mounted on the top end of the can; and FIGURE 7 is a fragmentary sectional view showing the cup ring mounted on the top end of the can.

The numeral 10 designates a metal can of conventional construction having a soldered longitudinal seal 11 and top and bottom rolled beads 12 and 13 securing a top disc 14 and a bottom (not shown) in hermetically sealed assembly. Such a can may be provided, along with the other parts of the stand, filled with a liquid preservative for keeping the tree fresh and green. The can, however, requires no special adaptation for the present purpose and any conventional cylindrical can of the proper size may be used.

The can 10 is stabilized against overturning by three identical legs 20, each having an arcuate cylindrical flange portion 21 of slightly less than 120° arcuate extent and a radius of curvature to fit the can. Adjacent and integral with each flange portion 21 on one side of the leg is an ear 22 having a countersunk end hole 23. On the opposite side of the leg is a similar ear 24 having an end hole 25. The ear 24 on each leg is positioned slightly below the level of ear 22 so that the ear 22 on each leg will overlap the ear 24 of an adjacent leg, as shown, bringing the holes 23 and 25 into approximate register when the legs are assembled on the can.

The ears 22 and 24 are connected together by bolts 26 and nuts 27. The holes 23 and 25 are slightly larger than bolts 26 and the parts are proportioned so that when the legs are assembled about the bottom portion of the can, the holes 23 and 25 will fall short of exact registry. This causes the bolts to cant as shown in FIGURE 4 when they are inserted in the holes. Then, when nuts 27 are applied and tightened, the bolts are thereby straightened into vertical positions pulling the holes into register and causing flange portions 21 to form a constrictive collar cinching and gripping the cylindrical surface of the can just above its bottom bead 13. This clamping action is facilitated by small graps at 19 permitting the ends of the flange portions to be drawn toward each other. The ends of the legs are equipped with foot portions 28 disposed in the plane of the can bottom when the parts are assembled, to provide a solid and stable base.

The other die formed part, which may be either stamped or cast, is the top cup ring 30. Ring 30 is of channel shape in cross section having a shallow inner annular flange 31 to fit within the top of the can after its top end has been removed and a deeper outer annular flange 32. Outer flange 32 is equipped with three smooth holes 33, the diameter of this outer flange being sufficiently larger than the outside diameter of the can to admit a nut 34 to be inserted between the flange and the surface of the can in register with each hole 33, as shown in FIGURES 6 and 7. The location of holes 33 close to the top edge of the ring 30 thus places the flat side edges of nuts 34, which are preferably square, substantially adjacent to the top bead 12 of the can so that the nuts cannot rotate.

Outer flange 32 may be provided in its upper portion with an annular inwardly projecting ridge or indentation, or other suitable means, to prevent rotation of the nuts when the container does not have a top bead 12. Also, the top wall of the channel will serve the same purpose if a larger nut is used. In any case, holes 33 are located slightly below the bottom edge of the inner flange 31. When thumbscrews 35 are inserted through holes 33 and engaged with the threads of nuts 34, they may be tightened causing the ends of the screws to pierce the can. In placing ring 30 on the top of the can, one of the holes 33 is located a short distance from the vertical seam 11 so that all the screws 35 will avoid the seam when the screws are tightened to pierce the can. The stand is then in readiness to receive the tree.

The lower end of the trunk is preferably cut on an angle as indicated at 36 to provide a large surface for moisture absorption. The can top 14 having been cut out by a can opener, two of its opposite side portions 37 are bent up as shown in FIGURE 2 so that it will pass through the ring 30. The can top is then attached to the end of the trunk by means of a large headed roofing nail 40.

The tree may then be set up in the can with the top 14 and head of nail 40 resting on the bottom of the can. The bottom end of the trunk cannot shift position in the bottom of the can because top 14 exactly fits the inner circumference of the can. The tree trunk is plumbed to vertical position and fastened securely by tightening the screws 35 against the trunk and causing the ends of the screws to pierce into the trunk to some extent. The preservative solution furnished in the can is absorbed into the slant cut surfaces 36 to keep the tree fresh and green.

The container need not be cylindrical but it is advantageous to use a container having a cylindrical portion in the region where the legs clamp the container. Instead of using a conventional form of can, a container of some special shape may be used if desired. The legs need not clamp the container at its lower end; this arrangement is preferred merely because it makes the legs shorter and thereby effects the greatest economy of material.

Having now described my invention and in what manner the same may be used, what I claim as new and desire to protect by Letters Patent is:

1. A tree stand comprising a container having a cylindrical lower portion, a plurality of radial legs having arcuate flange portions on their inner ends arranged to fit around said cylindrical portion of said container, means interconnecting said legs for clamping said flange portions around said container, a cup ring having an inner annular flange fitting within the upper end of said container and an outer annular flange spaced outwardly from said container, said outer flange having holes for clamp screws, radial clamp screws in said holes, and nuts on said screws confined loosely between said container and said outer flange.

2. A tree stand comprising a container having a cylindrical lower portion, a plurality of radial horizontal legs having arcuate flange portions on their inner ends fitting the curvature of said cylindrical portion of the container, horizontal ears on said flange portions having openings, the ears of adjacent legs overlapping each other with said openings slightly out of register when said legs are assembled on said container, bolts insertable in said openings in canted position, and nuts on said bolts adapted when tightened against said ears to straighten said bolts into vertical position constricting said flange portions into tight clamping engagement with said container.

3. In a tree stand, a plurality of separate identical legs, each leg having an arcuate flange portion on its inner end, horizontal ears on opposite sides of each leg adjacent the ends of said flange portion, said ears being offset vertically to overlap and underlap the ears of adjacent legs, and openings in said ears to receive vertical bolts for clamping said legs in horizontal position on the bottom portion of a cylindrical container, said bolts and ears constituting the sole interconnection between said legs.

4. In a tree stand, a cylindrical can having a circumferential bead around its upper end, a cup ring of channel shape in cross section having a shallow inner annular flange fitting within said can and a deeper outer annular flange spaced outwardly from said can, clamp screw openings in said outer flange, radial clamp screws in said openings, and square nuts on said clamp screws loosely confined between said can and said outer flange and restrained against rotation by said circumferential bead so that said screws will pierce said can when tightened in said nuts.

5. In a tree stand, a container having a circular upper end, a cup ring of channel shape in cross section having a shallow inner annular flange fitting within the upper end of the container and a deeper outer annular flange spaced outwardly from the container, clamp screw openings in said outer flange, radial clamp screws in said openings, polygonal nuts on said clamp screws loosely confined between said container and said outer flange, and means restraining rotation of said nuts so that said screws will pierce the can when turned in said nuts.

References Cited in the file of this patent

UNITED STATES PATENTS

| | | |
|---|---|---|
| 685,049 | Kerr | Oct. 22, 1901 |
| 1,172,734 | Raymond | Feb. 22, 1916 |
| 1,853,164 | Block | Apr. 12, 1932 |
| 1,987,995 | Doring | Jan. 15, 1935 |
| 2,205,271 | Pleiss | June 18, 1940 |
| 2,750,138 | Morris | June 12, 1956 |
| 2,815,908 | Scanland | Dec. 10, 1957 |

FOREIGN PATENTS

| | | |
|---|---|---|
| 22,993 | Sweden | Jan. 30, 1907 |